(12) United States Patent
Song et al.

(10) Patent No.: US 6,856,372 B2
(45) Date of Patent: Feb. 15, 2005

(54) LIQUID CRYSTAL DISPLAY (LCD) DEVICES HAVING REDUNDANT PATTERNS

(75) Inventors: Jun-Ho Song, Kyungki-do (KR); Kyeong-Nam Lee, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 182 days.

(21) Appl. No.: 10/140,139

(22) Filed: May 7, 2002

(65) Prior Publication Data

US 2002/0126232 A1 Sep. 12, 2002

Related U.S. Application Data

(63) Continuation of application No. 09/804,350, filed on Mar. 12, 2001, now Pat. No. 6,411,358, which is a continuation of application No. 09/106,226, filed on Jun. 29, 1998, now Pat. No. 6,215,541.

(30) Foreign Application Priority Data

Nov. 20, 1997 (KR) ............................................ 97-61456
Feb. 16, 1998 (KR) ............................................. 98-4562

(51) Int. Cl.$^7$ ........................ G02F 1/1343; G02F 1/136
(52) U.S. Cl. ........................................ 349/141; 349/42
(58) Field of Search ..................... 349/42–43, 141–143; 257/59, 72

(56) References Cited

U.S. PATENT DOCUMENTS

| 4,821,092 | A | * | 4/1989 | Noguchi ........................ 357/4 |
| RE33,829 | E | | 2/1992 | Castleberry .................. 349/42 |
| 5,462,885 | A | | 10/1995 | Nasu et al. ................... 437/40 |
| 5,523,865 | A | * | 6/1996 | Furuta et al. ................ 349/42 |
| 5,760,854 | A | | 6/1998 | Ono et al. .................... 349/44 |
| 5,793,459 | A | * | 8/1998 | Toko ........................... 349/128 |
| 5,907,379 | A | | 5/1999 | Kim et al. ................... 349/141 |
| 5,917,198 | A | | 6/1999 | Maeda ......................... 257/72 |
| 5,929,958 | A | | 7/1999 | Ohta et al. .................. 349/141 |
| 6,049,369 | A | | 4/2000 | Yanagawa et al. .......... 349/141 |
| 6,133,977 | A | | 10/2000 | Lee et al. ................... 349/141 |
| 6,215,541 | B1 | | 4/2001 | Song et al. ................. 349/141 |
| 6,411,358 | B2 | * | 6/2002 | Song et al. ................. 349/141 |

* cited by examiner

Primary Examiner—Dung Nguyen
(74) Attorney, Agent, or Firm—McGuireWoods LLP

(57) ABSTRACT

A gate wire including a gate line, a gate electrode, a gate pad and a gate line connector and a common signal wire are formed on a substrate, and a gate insulating layer is formed over the gate wire and the common signal wire. A semiconductor layer and an ohmic contact layer are sequentially formed on the gate insulating layer, a data wire including a source and a drain electrode, a data line, a data pad and a data line connector and a pixel electrode are formed thereon. The thickness of the data wire and the pixel electrode is equal to or less than 500 Å. A passivation layer is formed on the data wire and the pixel electrode, a redundant data wire is formed thereon, and a redundant gate pad and a redundant gate line connector are formed. The redundant data wire is electrically connected to the data wire through the contact holes in the passivation layer, and the redundant gate pad and the redundant gate line connector are electrically connected to the gate pad and the gate line connector respectively through the contact holes in the passivation layer and the gate insulating layer. The redundant gate line connector and the redundant data line connector are connected to each other to short the gate and the data wires. After an alignment layer is formed and rubbed, the edge of the panel is cut away to remove the gate line connector and the data line connector.

26 Claims, 23 Drawing Sheets

LIQUID CRYSTAL DISPLAY (LCD) DEVICES HAVING REDUNDANT PATTERNS

This application is a continuation of U.S. application Ser. No. 09/804,350, filed Mar. 12, 2001, now U.S. Pat. No. 6,411,358, which is a continuation of U.S. application Ser. No. 09/106,226, filed Jun. 29, 1998, now U.S. Pat. No. 6,215,541, the disclosures of which are hereby incorporated herein by reference.

BACKGROUND OF THE INVENTION a. Field of the Invention

The present invention relates to liquid crystal displays and manufacturing methods thereof, more specifically to liquid crystal displays having electrode arrays for applying electric fields parallel to substrates and thin film transistors as switching elements and manufacturing methods thereof.

b. Description of the Related Art

A liquid crystal display (LCD) having an electrode array for generating an electric field which is parallel to substrates (IPS mode; in-plane switching mode) is disclosed in U.S. Pat. No. 5,598,285 of Kondo et al.

The IPS mode LCD of Kondo et al. has two substrates opposite each other and a liquid crystal layer therebetween. Two kinds of electrodes for generating electric field, common electrodes and pixel electrodes are formed on one of the substrates. An alignment layer is coated on the electrodes.

However, since the two kinds of electrodes are made of different layers and have different thickness, the surface of the alignment layer may not be flat, and this causes non-uniform rubbing which may result in light leakage.

Moreover, the liquid crystal display of Kondo et al., in particular, transistors of the liquid crystal display are easily defected by the electrostatic discharge because the two electrodes are formed together on a single substrate.

For electrostatic discharge protection, all wires may be short-circuited during the manufacturing process and separated after the manufacture of the panel is completed. However, this method is complicated.

SUMMARY OF THE INVENTION

In view of the above, it is an object of the present invention to reduce the light leakage of IPS mode liquid crystal displays.

It is another object of the present invention to prevent thin film transistors from being destroyed by the electrostatic discharge.

It is another object of the present invention to simplify the manufacturing process of IPS mode liquid crystal displays.

It is another object of the present invention to decrease the opening of wires.

It is another object of the present invention to increase the reliability of the contacts between pads and drivers These and other objects, features and advantages are provided, according to the present invention, by forming a pixel electrode using a thin single conductive layer, and a data line Is formed as a double layer.

The thickness of the single conductive layer forming a pixel electrode may be equal to or less than 1,000 Å. It is more preferable that the thickness of the single conductive layer is equal to or less than 500 Å. The double layer forming a data line may include a lower layer, which is the same as the pixel electrode, and an upper layer having a low resistivity of 15 $\mu\Omega$cm or less. The single layer or the lower layer of the double layer may be formed using a metal having a low resistivity of 15 $\mu\Omega$cm or less, and the upper layer may be formed by a pad material which is not easily broken in the manufacturing process.

A passivation layer which is thick relative to the pixel wire may have relatively flat surface since the pixel wire is relatively thin. The flat surface may give rise to uniform rubbing and thus the light leakage may be reduced.

These and other objects, features and advantages are also provided, according to the present invention, by forming a common signal wire and a gate wire including a gate line, a gate electrode, a gate pad and a gate line connector on a substrate, forming a gate insulating layer over the common signal wire and the gate wire, forming a channel layer and an ohmic contact layer thereon, forming a pixel electrode and a data wire including a source and a drain electrodes, a data line, a data pad and a data line connector using a first conductive layer, forming a passivation layer on the data wire and the pixel electrode, forming a redundant data wire including a redundant data line, a redundant data pad and a redundant data line connector, a redundant gate pad and a redundant gate line connector using a second conductive layer. The redundant data wire is electrically connected to the data wire through the contact holes formed in the passivation layer. The redundant gate pad and the redundant gate line connector are connected to the gate pad and the gate line connector respectively through the contact holes formed in the gate insulating layer and the passivation layer. The redundant gate line connector and the redundant data line connector are connected with each other to short circuit the gate lines and the data lines on the substrate.

After forming the panel, an alignment layer is printed and rubbed, and the gate line connector and the data line connector are removed by cutting out the edge of the panel.

The pixel electrode may be formed in the step of forming redundant data wire using the second conductive layer instead of the first conductive layer, and the thickness of the pixel electrode may be equal to or less than 500 Å.

The redundant data wire may be formed as a single or a double layer, and the single layer or the upper layer of the double layer may be formed using a pad material which is not easily broken in the manufacturing process.

DETAILED DESCRIPTION OF THE PREFERRED EMBODIMENTS

Figure 1:
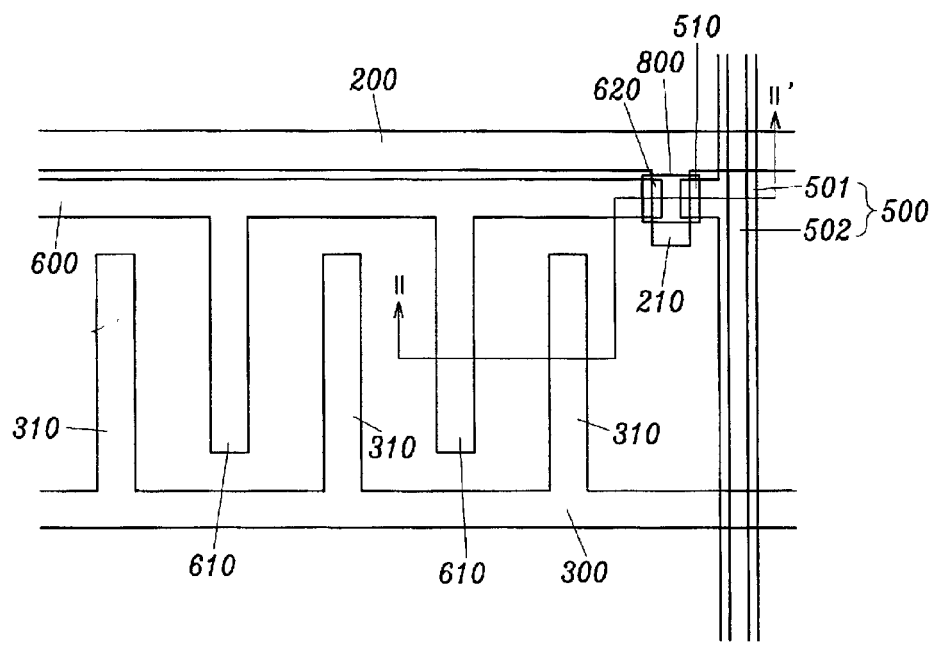
FIG. 1 is a layout view of a panel for a liquid crystal display according to the first embodiment of the present invention.

The present invention will now be described more fully hereinafter with reference to the accompanying drawings, in which preferred embodiments of the present invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity.

Figure 2:
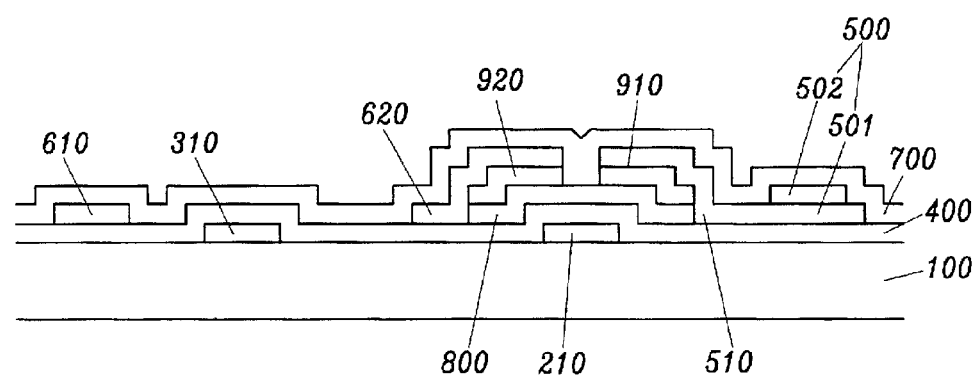
FIG. 2 shows a cross-sectional view of the panel illustrated in FIG. 1 taken along the line II–II'.

First, the structure of a panel for a liquid crystal display according to the first embodiment of the present invention will be described. FIG. 1 is a layout view of a panel, and FIG. 2 is a cross-sectional view of the panel illustrated in FIG. 1 taken along the line II–II'.

A gate wire including a transverse gate line 200 and a gate electrode 210 which is a branch of the gate line 200 is formed on a substrate 100. A common signal wire including a common signal line 300 parallel to the gate line 200 and a plurality of linear common electrodes 310 connected to the common signal line 300 is also formed on the substrate 100. The common electrodes 310 extend toward the gate line 200, and they are spaced apart from each other and parallel to each other.

A gate insulating layer 400 is formed over the gate wire 200 and 210 and the common signal wire 300 and 310.

A channel layer 800 and an ohmic contact layer 910 and 920 are sequentially formed on a portion of the gate insulating layer 400 over the gate electrode 210. The ohmic contact layer has two portions 910 and 920 separated from each other with respect to the gate electrode 210. A longitudinal data line 500 are formed on the gate insulating layer 300, and a source electrode 510, a branch of the data line 500 extending to the gate electrode 210, is formed on one portion 910 of the ohmic contact layer. The data line 500 intersects the gate line 200 near the gate electrode 210, and has a double-layered structure including a lower chromium layer 501 of about 500 Å and an upper aluminum layer 502 of about 2,000 Å, while the gate electrode 210 has a single chromium layer. On the gate insulating layer 400, a pixel wire including a transverse pixel electrode line 600 and a plurality of pixel electrodes 610 which are branches of the pixel electrode line 600 extending toward the common signal line 300 is also formed between the gate line 20 and the common electrode line 300. The pixel electrodes 610 and the common electrodes 310 are parallel and spaced apart. A drain electrode 620, which is connected to an end portion of the pixel electrode line 600, is formed on the other portion 920 of the ohmic contact layer. The pixel wire 600 and 610 and the drain electrode 620 are formed of a single chromium layer of about 500 Å.

A passivation layer 700 is formed over the pixel wire 600 and 610, the data line 500, the source and the drain electrodes 510 and 620.

Since the data line 500 has a double-layered structure, although the pixel wire 600 and 610 is relatively thin, for example, has thickness of around 500 Å, the data line 500 may not be easily opened. Accordingly, the passivation layer 700 which is thick relative to the pixel wire 600 and 610 may have relatively flat surface. The flat surface may give rise to uniform rubbing and thus the light leakage may be reduced. The measured contrast ratio of the liquid crystal display according to the first embodiment of the present invention is about 120, while that in the conventional liquid crystal displays is about 60.

The thickness of the pixel wire 600 and 610 may be equal to or less than 1,000 Å, and that of the passivation layer 700 may be 2,000–4,000 Å such that the passivation layer 700 has a relatively flat surface. It is more preferable that the thickness of the pixel wire 600 and 610 is equal to or less than 500 Å. Although the small thickness of the pixel wire 600 and 610 may cause relatively large resistance, it may be allowed for the LCD.

The lower layer 501 and the upper layer 502 forming the data line 500 are not restricted to chromium and aluminum respectively. The lower layer 501 may be made of a conductive material having low resistivity of 15 $\mu\Omega$cm or less, and the upper layer 502 may be made of a pad material which is not easily broken in the manufacturing process.

Now, a manufacturing method of the panel according to the first embodiment of the present invention will be described. FIGS. 3A–3D are cross-sectional views of the intermediate structures of the panel shown in FIGS. 1 and 2 in the manufacturing steps.

Figure 3A:
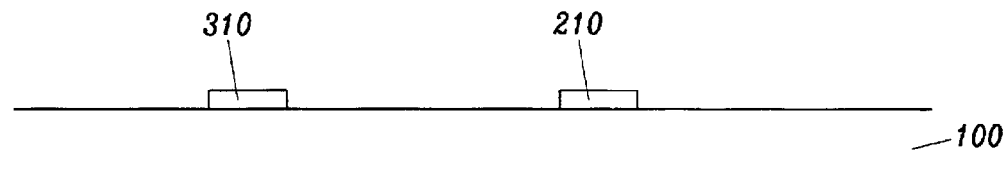
FIGS. 3A–3D are cross-sectional views of the intermediate structures of the panel shown in FIGS. 1 and 2 in the manufacturing steps.

A metal layer is deposited and patterned to form a gate wire 200 and 210 and a common signal wire 300 and 310, as shown in FIG. 3A.

Figure 3B:
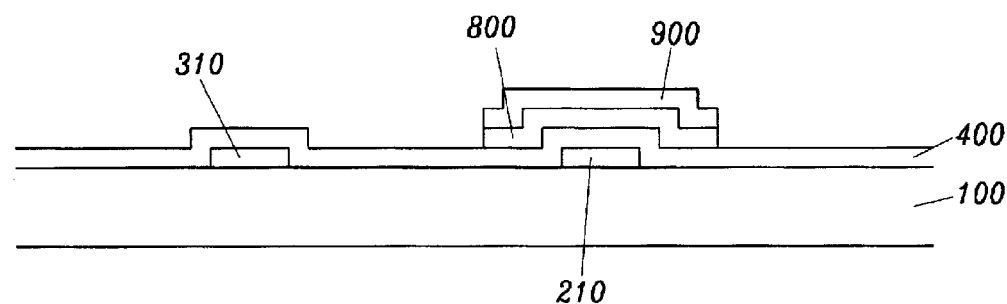

A gate insulating layer 400, an intrinsic amorphous silicon layer 800 and a doped amorphous silicon layer 900 are deposited in sequence, and as shown in FIG. 3B, the intrinsic and the doped amorphous silicon layers are patterned together.

Figure 3C:
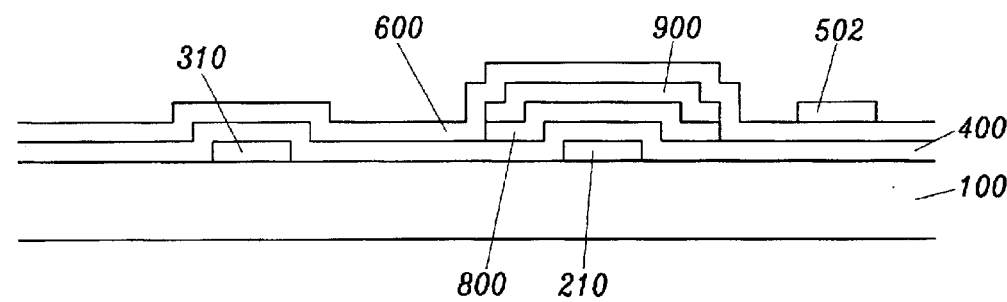
Figure 3D:
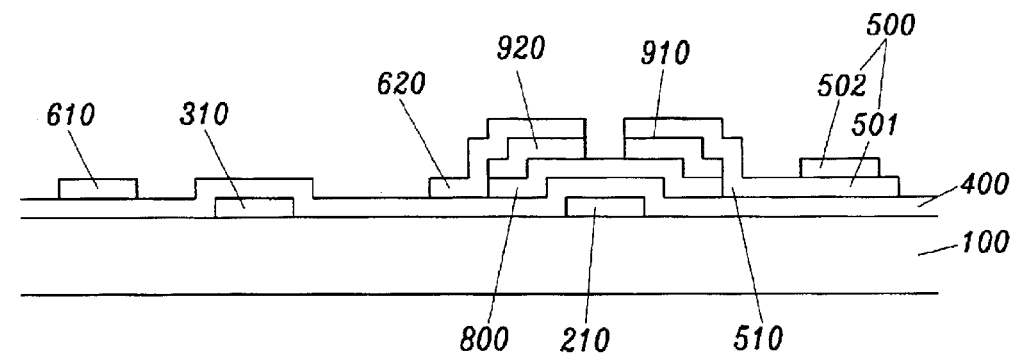

A chromium layer 600 of around 500 Å and an aluminum layer of around 2,000 Å are deposited in sequence. As shown in FIG. 3C, the aluminum layer is patterned to form an upper layer 502 of a data line 500. Next, as shown in FIG. 3D, the chromium layer 600 is patterned to form a lower layer 501 of the data line 500, a source electrode 510, a drain electrode 620 and a pixel wire 600 and 610. The doped amorphous silicon layer 900 is etched to form an ohmic contact layer 910 and 920 using the source and the drain electrodes 510 and 620 and the data line 500 as a mask. A passivation layer 700 is deposited thereon, as shown in FIG. 2.

Now, the second embodiment of the present invention is described, where a pixel wire and a data wire have small thickness and a relatively thick redundant data pattern connected to the data wire is provided on a passivation layer.

Figure 4:
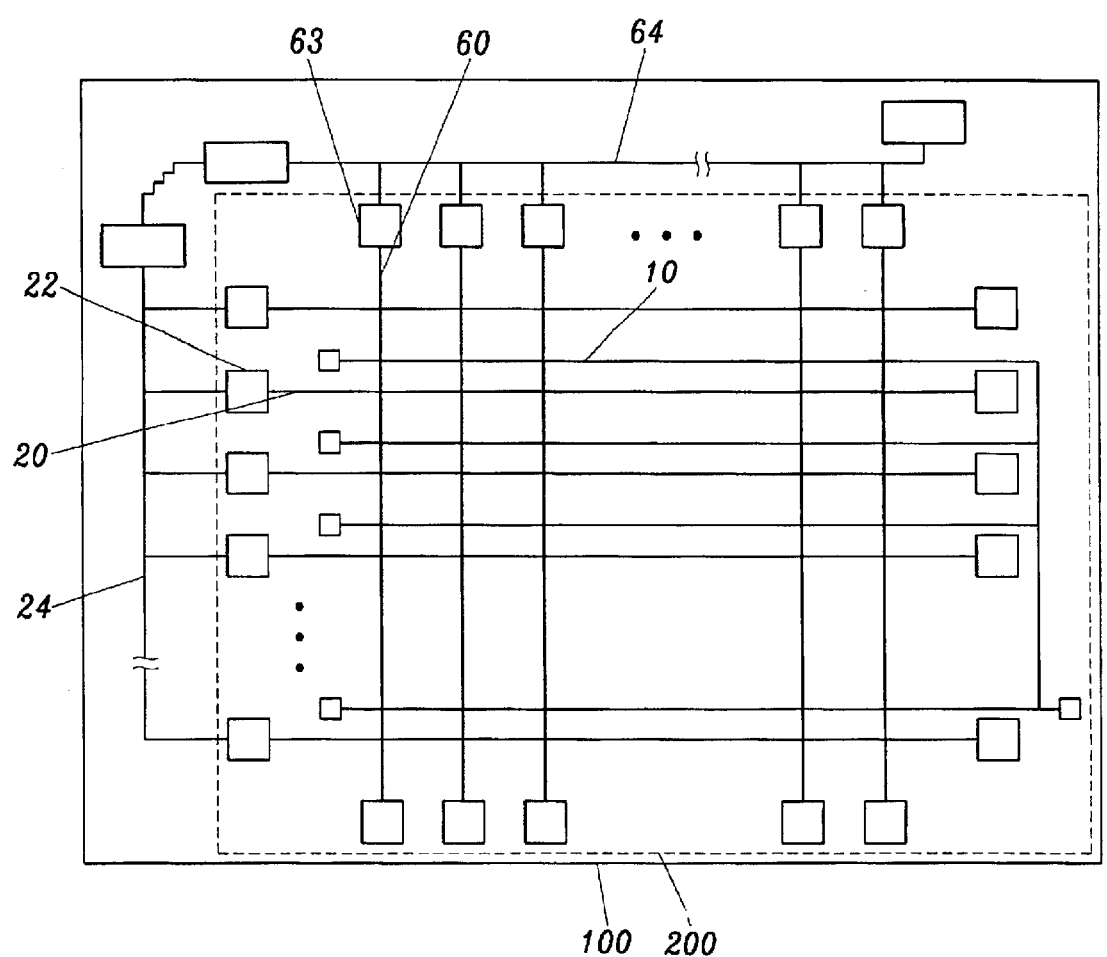
FIG. 4 is a schematic diagram of the LCD panel according to the second embodiment of the present invention.

First, the structure of the panel for a liquid crystal display according to the second embodiment will be described. FIG. 4 is a schematic diagram of the LCD panel according to the second embodiment.

As shown in FIG. 4, a plurality of gate lines 20 extending in a transverse direction are formed on a substrate 100, and a plurality of common signal lines 10 on the substrate 110 are arranged parallel to the gate lines 20. A plurality of gate pads 22, which are connected to external gate drivers (not shown), are formed to be connected to the ends of the gate lines 20. A gate line connector 24 is formed in a longitudinal direction and connected to the gate pads 22 via its branches. A plurality of data lines 60 extending in the longitudinal direction intersect and are insulated from the gate lines 20 and the common signal lines 10. A plurality of data pads 63, which are connected to external data drivers (not shown), are formed to be connected to the ends of the data lines 60. A data line connector 64 is formed in the transverse direction and connected to the data pads 63 via its branches. The gate line connector 24 and the data line connector 64 are connected to each other so that all the wires including the gate lines 20 and the data lines 60 on the substrate 100 are short-circuited.

This structure causes the electrostatic charges generated during the manufacturing process to be spread over the substrates, thereby protecting thin film transistors effectively. When manufacture of the panel is completed, the wires are separated by cutting out the gate and the data line connectors 24 and 64 along the dotted line 200 in FIG. 4.

In the meantime, a pixel region is defined by the gate lines 20 and the data lines 60, and the substrate 100 includes a plurality of pixels. A linear pixel electrode and a linear common electrode, not shown in FIG. 4, are formed alternately in the pixel region, and a thin film transistor connected to the gate line, the data line and the pixel electrode is also formed in the pixel region.

Figure 5:
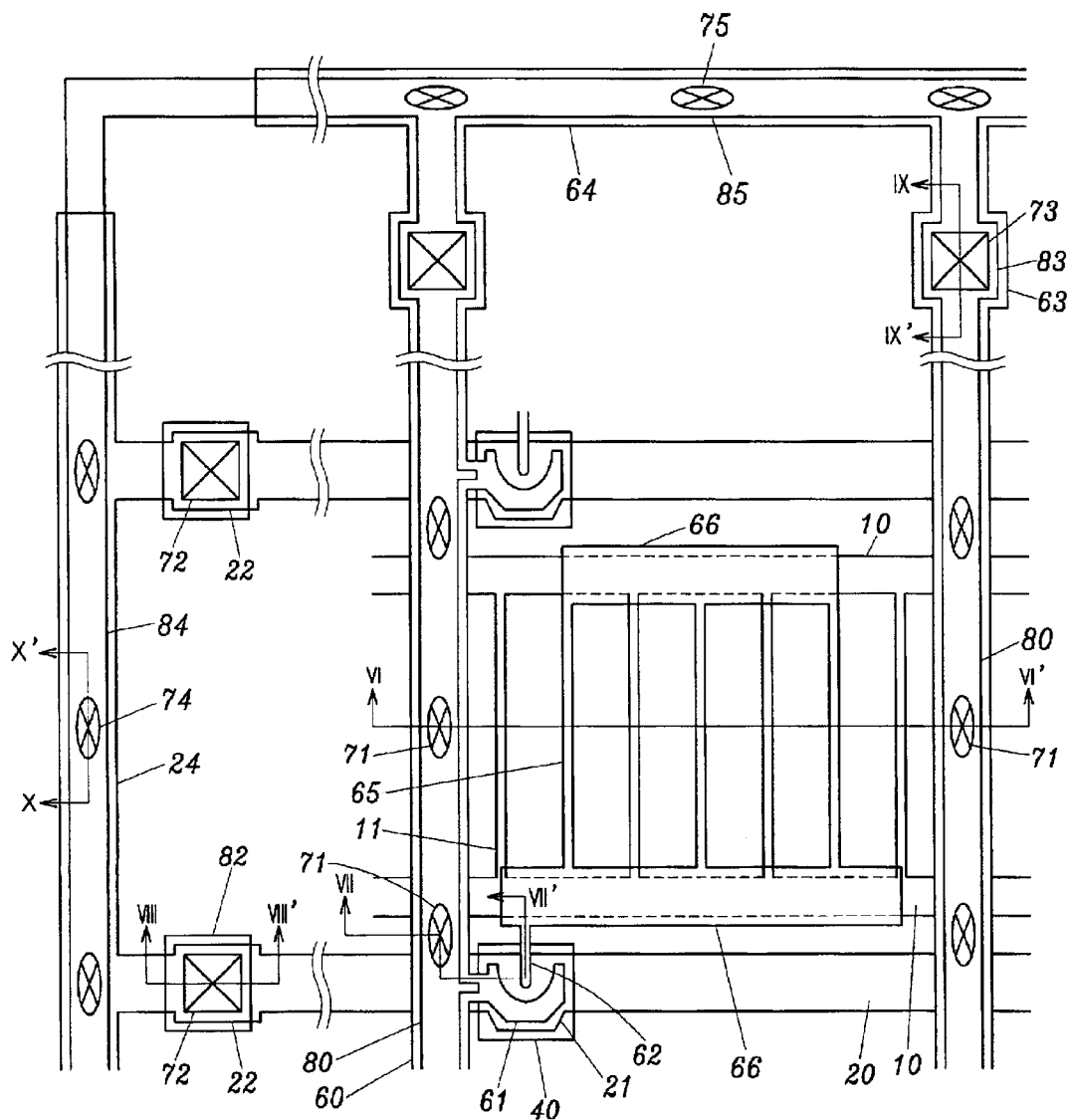
FIG. 5 shows a layout view of a panel for a liquid crystal display according to the second embodiment of the present invention.
Figure 6:
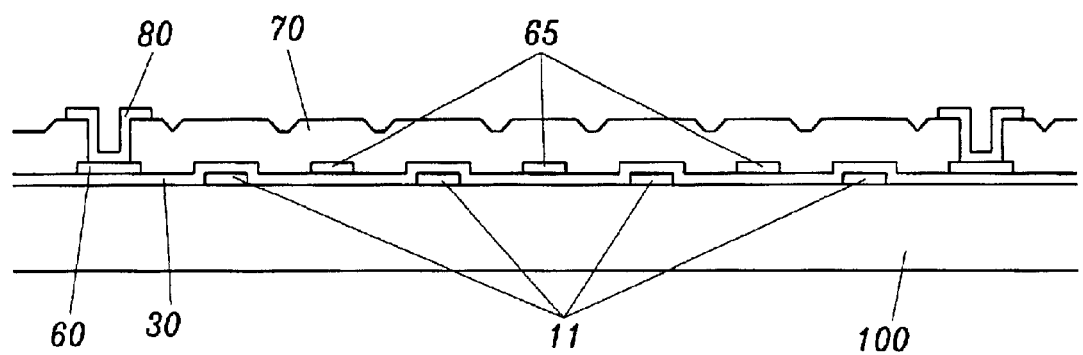
FIGS. 6–10 are cross-sectional views of the panel shown in FIG. 5 taken along the lines VI–VI', VII–VII', VIII–VIII', IX–IX' and X–X' respectively.
Figure 7:
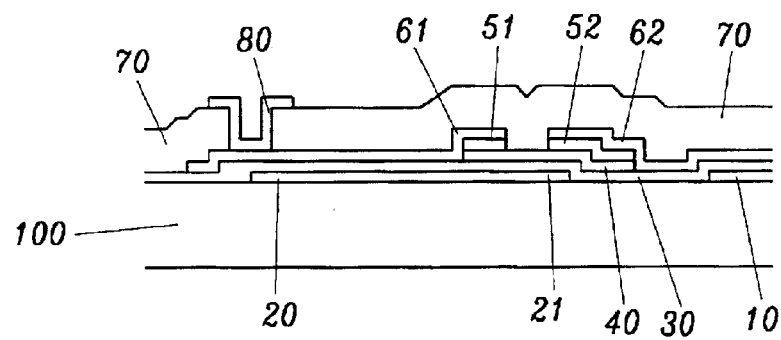
Figure 8:
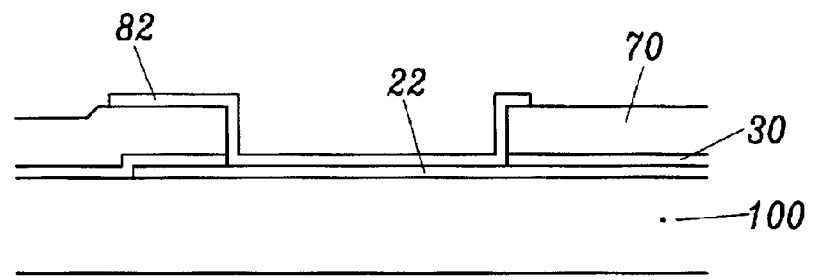
Figure 9:
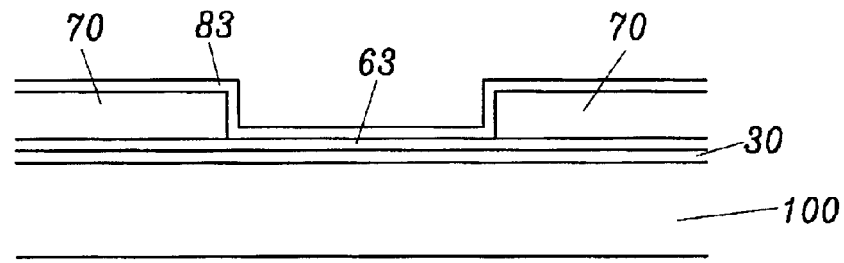
Figure 10:
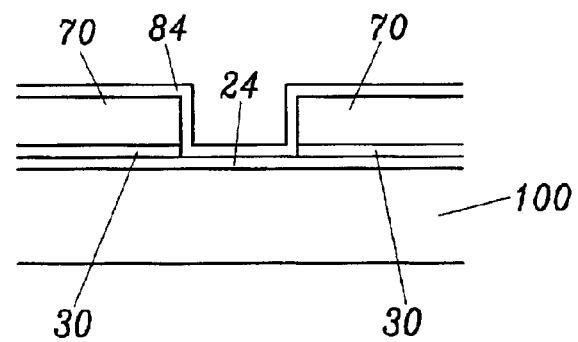
Figure 11A:
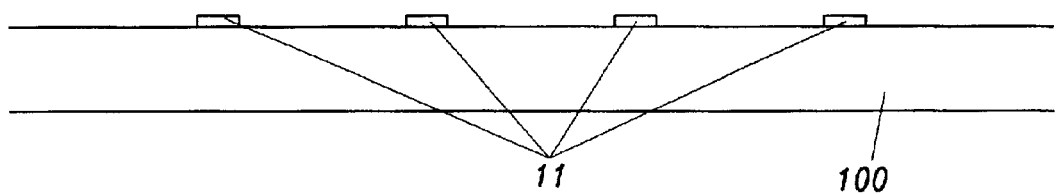
FIGS. 11A–14E are cross-sectional views of the intermediate structures of the panel shown in FIGS. 4–10 in the manufacturing steps.
Figure 11B:
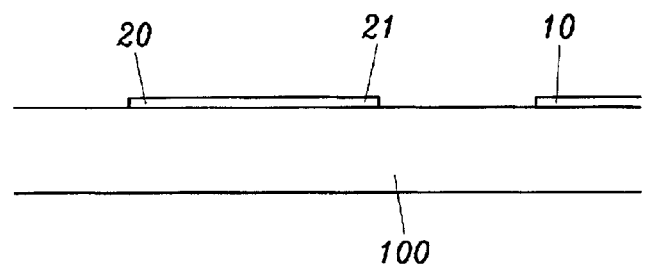
Figure 11C:
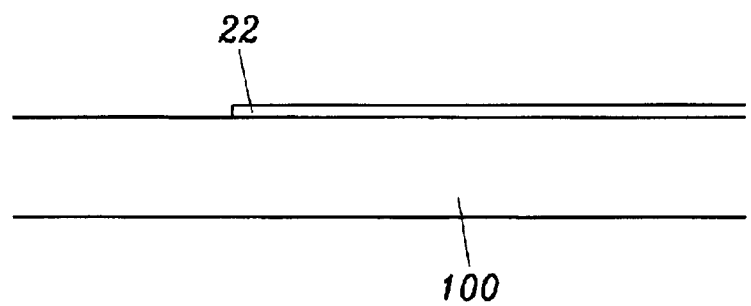
Figure 11D:
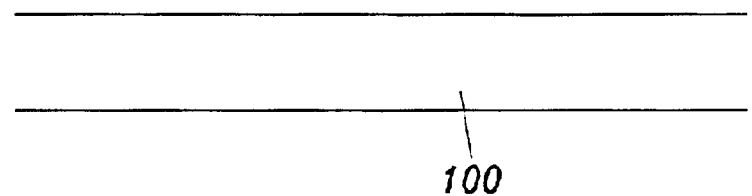
Figure 11E:
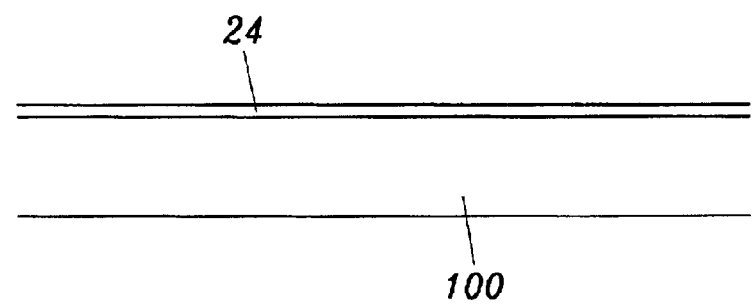

Now, the structure of the panel according to the second embodiment will be more fully described. FIG. 5 shows a layout view of a panel for a liquid crystal display according to the second embodiment of the present invention. FIGS. 6 to 10 are cross-sectional views of the panel shown in FIG. 5 taken along the lines VI–VI', VII–VII", VIII–VIII', IX–IX" and X–X' respectively.

As shown in FIGS. 5–10, a plurality of gate lines 20 extending in a transverse direction are formed on a transparent insulating substrate 100. The end portions of the gate lines 20 are enlarged to form gate pads 22, and several portions of the gate lines 20 serve as gate electrodes 21. A gate line connector 24 extending in a longitudinal direction is formed on the substrate 100 and connected to the gate pads 22 via its branches. A pair of common signal lines 10 and a plurality of spaced apart linear common electrodes 11 connected to both the common signal lines 10 are formed between the gate lines 20 on the substrate 100. The common electrodes 11 extend in the longitudinal direction and are parallel to each other.

A gate insulating layer 30 made of insulator such as silicon nitride is formed over a gate wire 20, 21, 22 and 24 and a common signal wire 10 and 11.

A plurality of channel layers 40 made of semiconductor such as amorphous silicon are formed on portions of the gate insulating layer 30 over the gate electrodes 21. A plurality of ohmic contact layers 51 and 52 made of a material reducing the contact resistance between the channel layers 40 and wires thereon such as heavily doped amorphous silicon are formed on the amorphous silicon layers 40, and each ohmic contact layer is divided into two portions 51 and 52 with respect to the gate electrode 21.

A plurality of data lines 60 are formed on the gate insulating layer 30 and extend longitudinally. The end portions of the data lines 60 are enlarged to form a plurality of data pads 63. A plurality of source electrodes 61 connected to the data lines 60 and drain electrodes 62 are formed on the respective portions of the ohmic contact layers 51 and 52. A pair of the pixel electrode lines 66 are formed on the gate insulating layer 30 and overlap the common signal lines 10. Linear pixel electrodes 65 connected to both the pixel electrode lines 66 are also formed on the gate insulating layer 30 and each pixel electrode 65 is placed between adjacent two of the common electrodes 11. A transverse data line connector 64 is formed on the gate insulating layer 30 and connected to the data pads 63 via its branches.

The gate electrode 21, the gate insulating layer 30, the amorphous silicon layer 40, the ohmic contact layer 51 and 52, and the source and the drain electrodes 61 and 62 form a thin film transistor for switching the display signals from the data line 60 responsive to the scanning signal from the gate line 10. The source electrode 61 is U-shaped while the drain electrode 62 is linear. The end of the drain electrode 62 is placed pointing towards the convex part of the source electrode 61. This arrangement of the source and the drain electrodes 61 end 62 enlarge the on current of the TFT.

A passivation layer 70 made of silicon nitride or the like is formed over the thin film transistor and the remaining data wire 60, 63, 64 and 65. The passivation layer 70 has contact holes 71, 73 and 75 which expose the mid-portions of the data line 60, the data pad 63 and the data line connector 64 respectively. In addition, the passivation layer 70 and the gate insulating layer 30 have contact holes 72 and 74 exposing the pate pads 22 and the gate line connector 24.

A conductor pattern 80 and 83 which has the similar shape to the data wire 60 and 63 is formed on the passivation layer 70 and connected to the data wire 60 and 63 through the contact holes 71 and 73 in the passivation layer 70. Therefore, the conductor pattern 80 and 83 functions as a redundant data wire. Another conductor pattern having a transverse portion 85 and a longitudinal portion 84 connected to each other is formed on the passivation layer 70. The transverse portion 85 has branches connected to the conductor pattern 83 and connected to the data line connector 64 via the contact holes 75, and the longitudinal portion 84 is connected to the gate line connector 24 through the contact holes 74. Conductor patterns 82 are also formed on the passivation layer 70 and connected to the gate pads 22 through the contact holes 72.

A manufacturing method of a panel for a liquid crystal display according to the second embodiment of the present invention will be now described. FIGS. 11A–14E are cross-sectional views of the intermediate structures of the panel shown in FIGS. 4–10 in the manufacturing steps. The manufacturing method according to the second embodiment uses 5 masks. The figures having the view numbers including the capital letters A, B, C, D and E following Arabic numerals correspond to the FIGS. 6–10, respectively.

First, as shown in FIGS. 11A–11E, a metal layer of 3,000 Å is deposited and patterned using a first mask to form a gate wire including a gate line 20, a gate electrode 21, a gate pad 22 and a gate line connector 24 and a common signal wire including a common signal line 10 and common electrodes 11. The gate wire and the common signal wire may be a single layer of chromium, aluminum, aluminum alloy, or molybdenum, etc., or may have a double-layered structure composed of two metal layers.

Figure 12A:
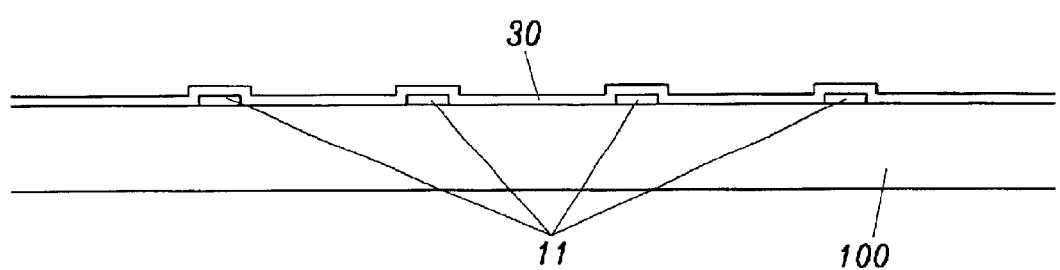
Figure 12B:
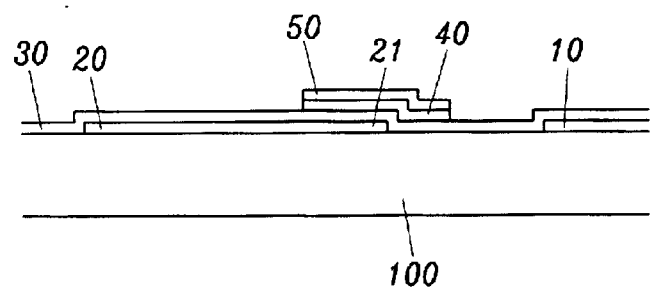
Figure 12C:
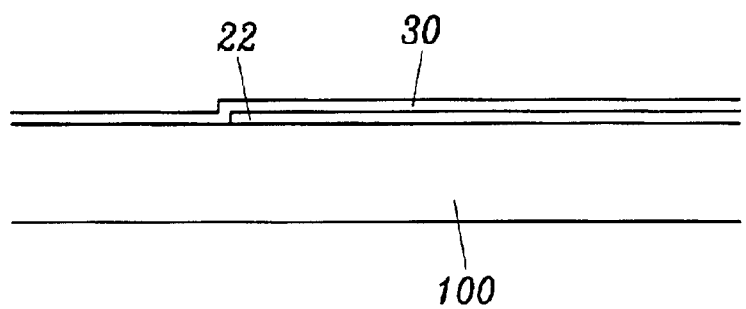
Figure 12D:
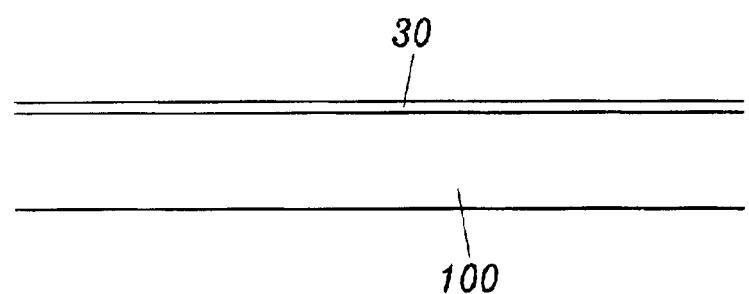
Figure 12E:
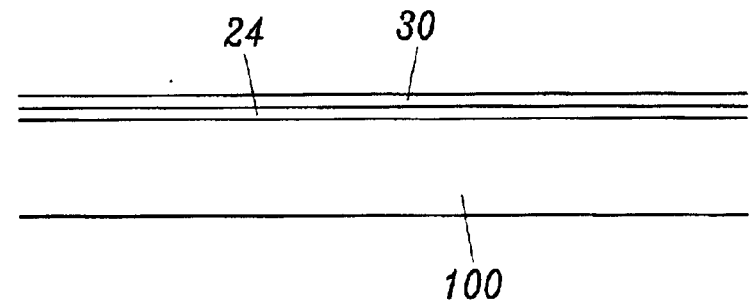
Figure 13A:
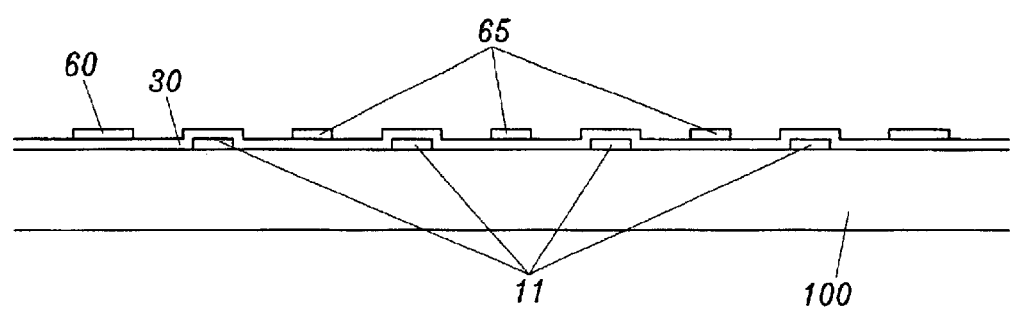
Figure 13B:
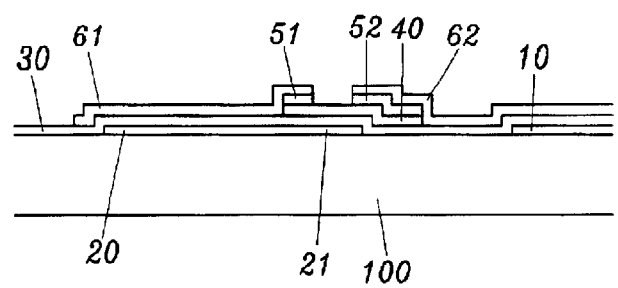
Figure 13C:
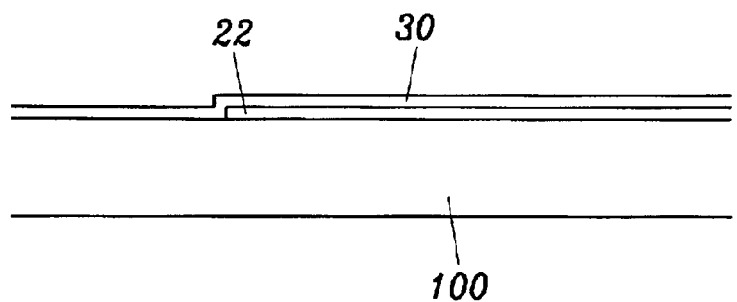
Figure 13D:
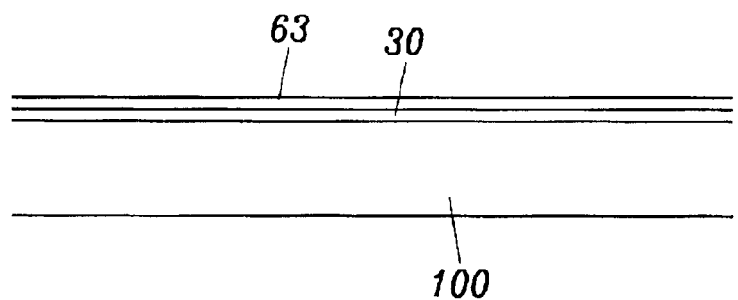
Figure 13E:
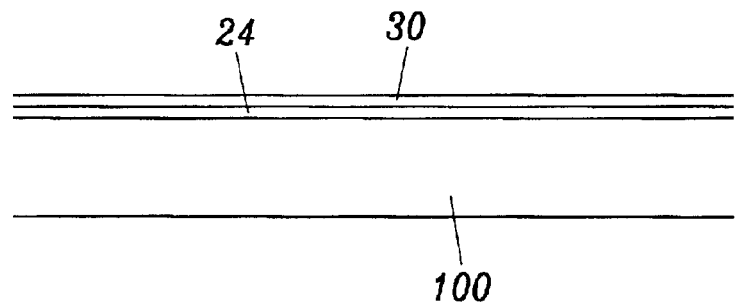
Figure 14A:
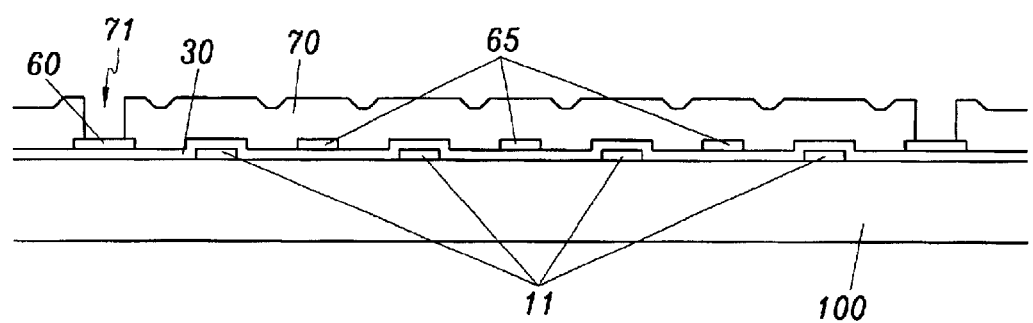
Figure 14B:
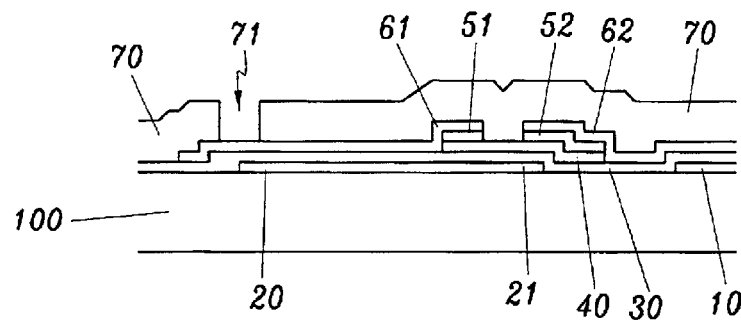
Figure 14C:
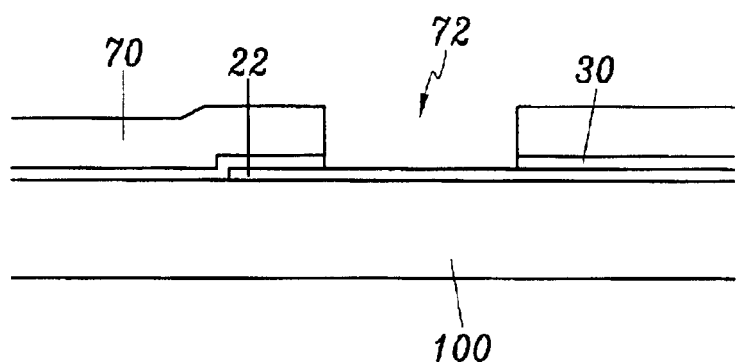
Figure 14D:
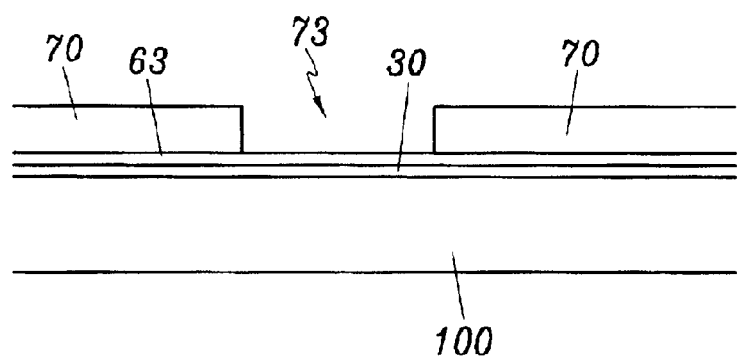
Figure 14E:
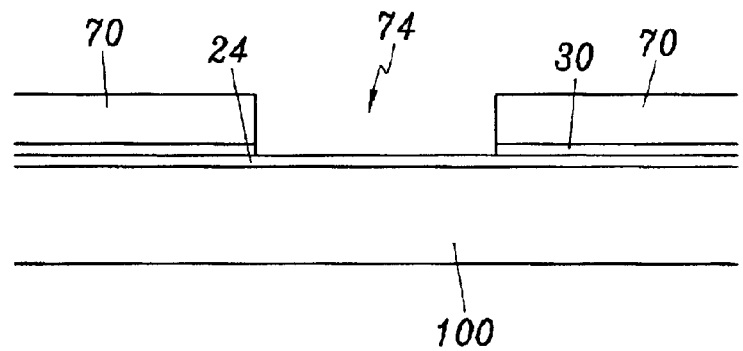
Figure 15A:
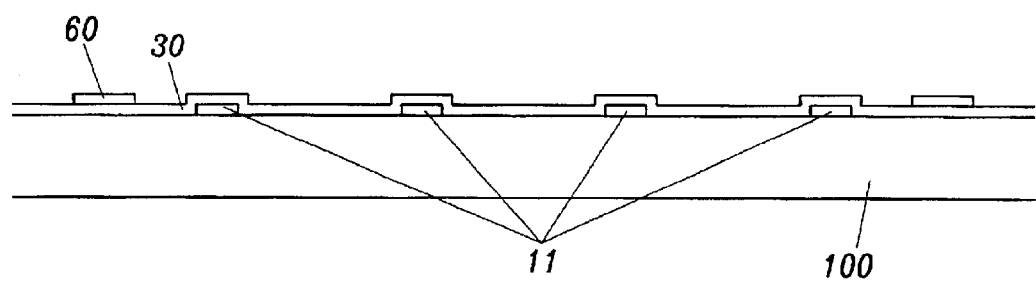
FIGS. 15A–17E are cross-sectional views of the intermediate structures of the panel for a liquid crystal display according to another embodiment of the present invention.
Figure 15B:
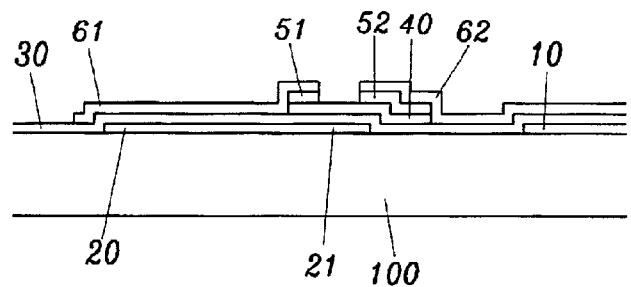
Figure 15C:
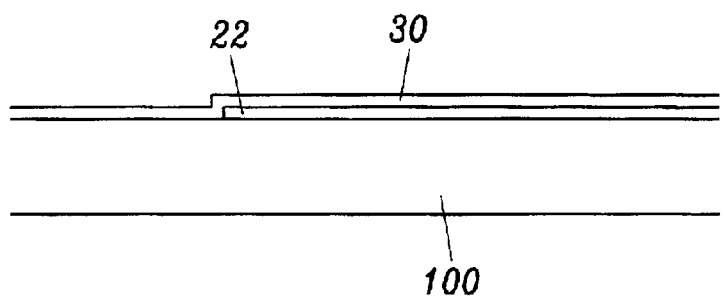
Figure 15D:
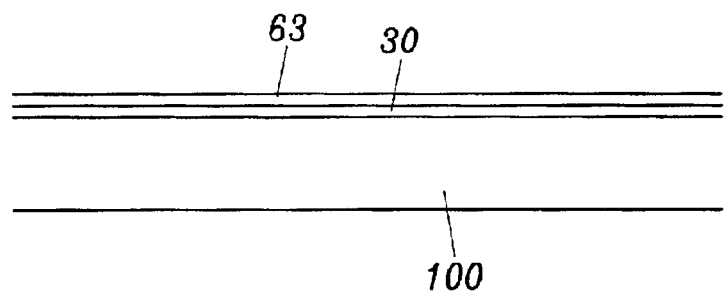
Figure 15E:
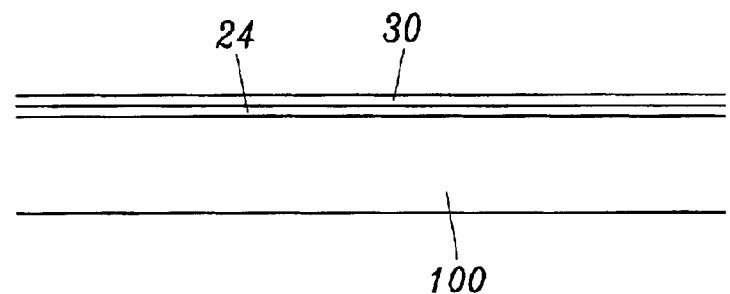
Figure 16A:
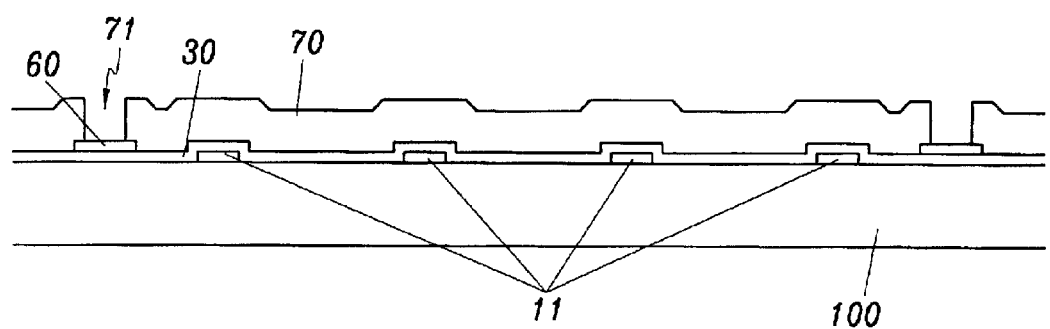
Figure 16B:
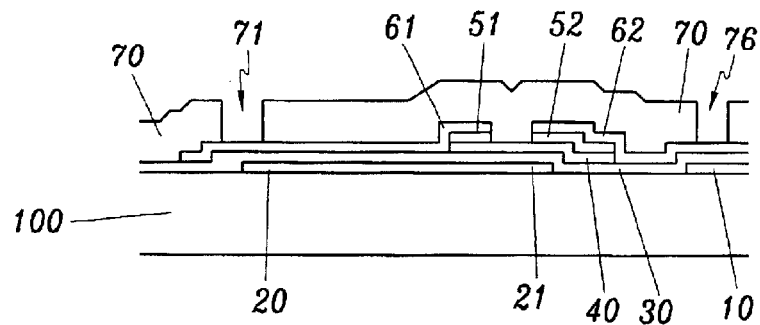
Figure 16C:
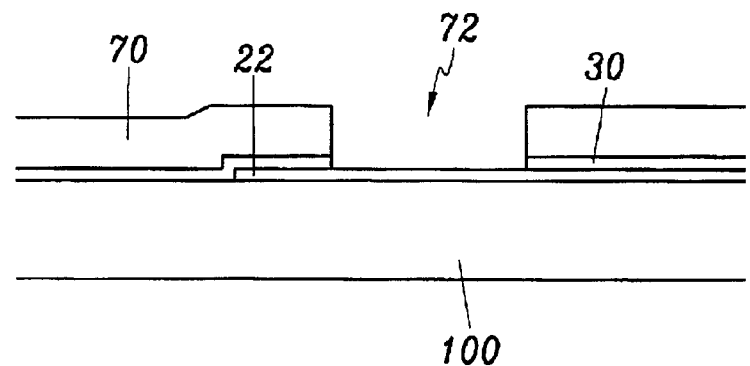
Figure 16D:
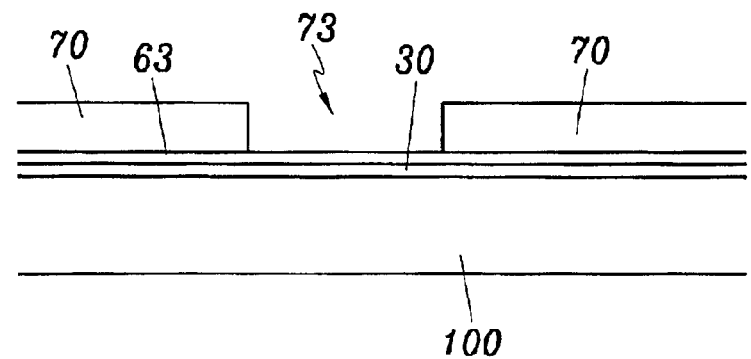
Figure 16E:
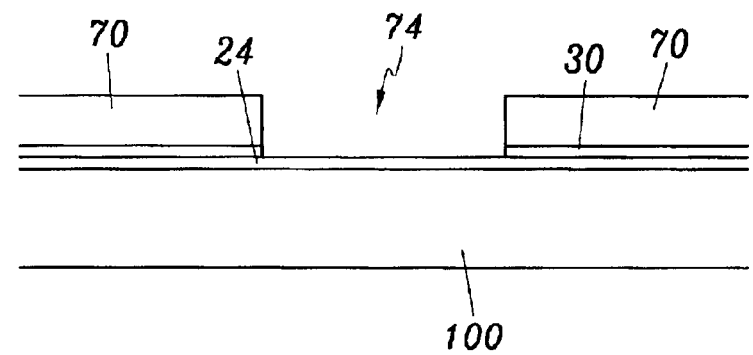
Figure 17A:
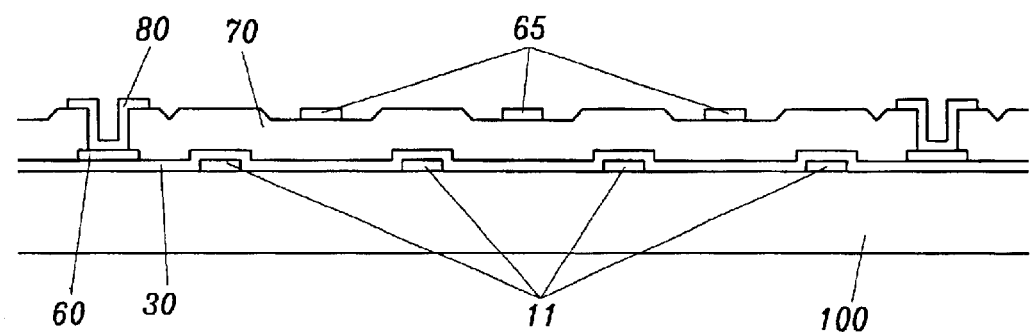
Figure 17B:
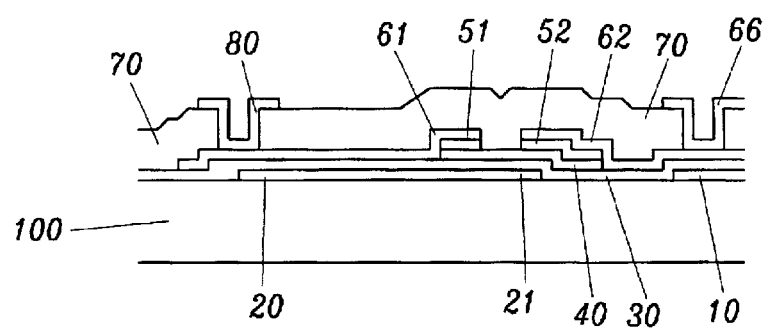
Figure 17C:
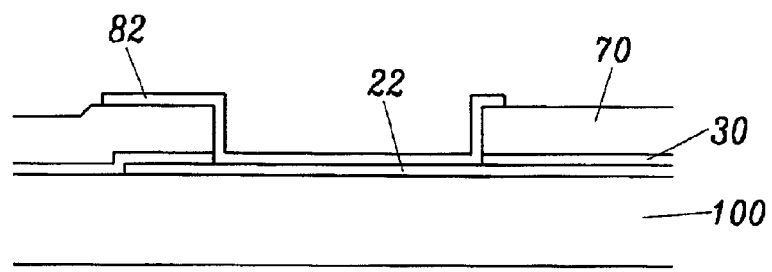
Figure 17D:
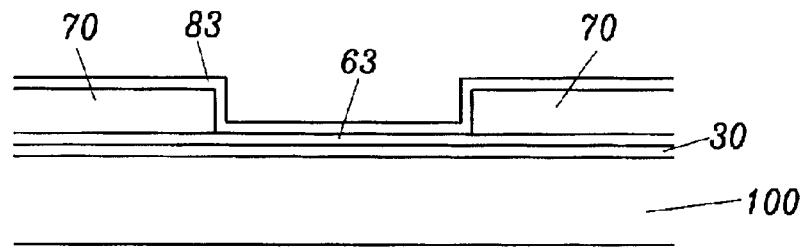
Figure 17E:
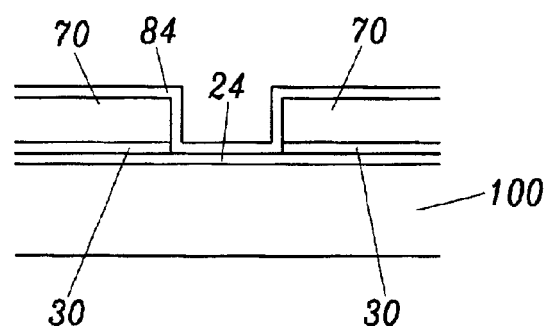
Figure 18:
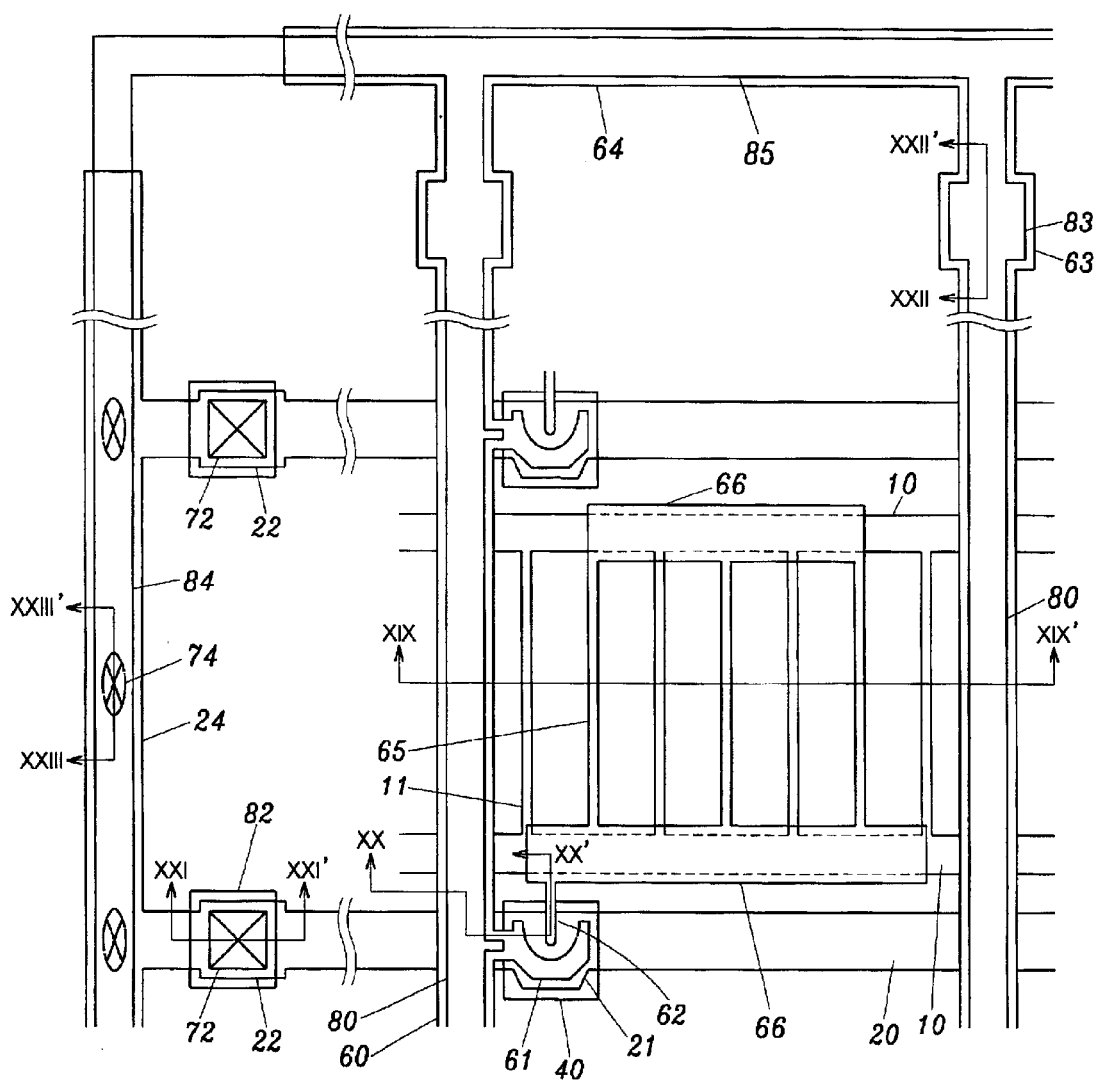
FIG. 18 shows a layout view of a panel for liquid crystal display according to another embodiment of the present invention.
Figure 19:
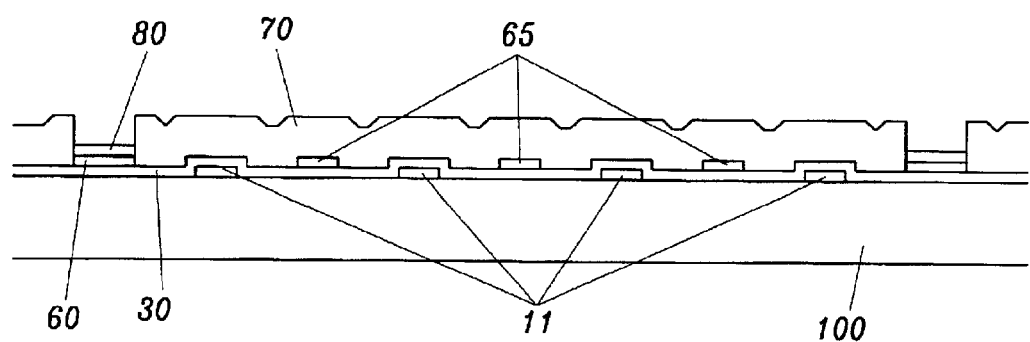
FIGS. 19–23 are cross-sectional views of the panel shown in FIG. 18 taken along the lines XIX–XIX', XX–XX', XXI–XXI', XXII–XXII' and XXIII–XXIII' respectively.
Figure 20:
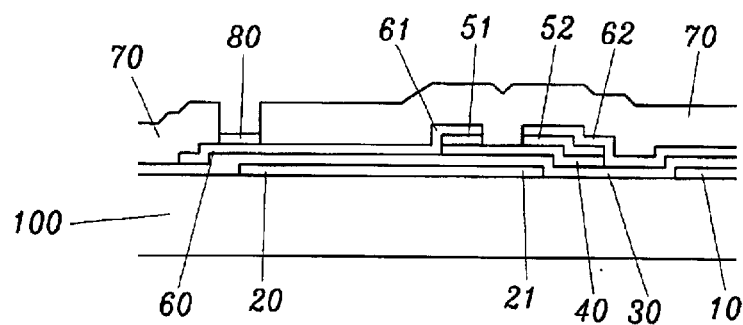
Figure 21:
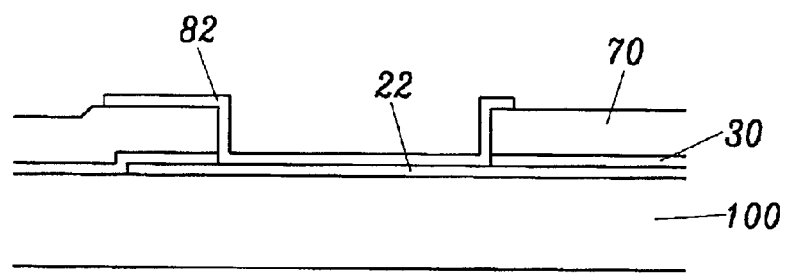
Figure 22:
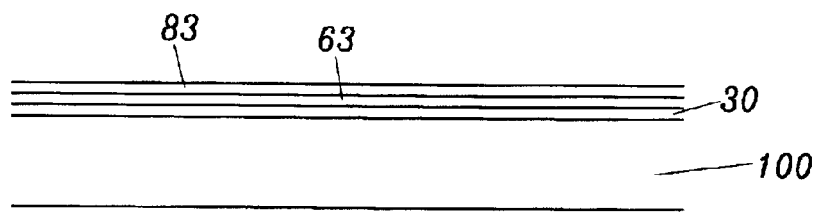
Figure 23:
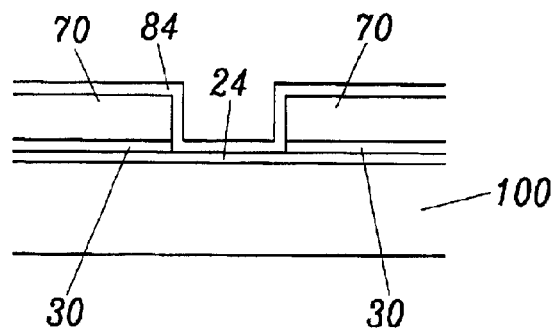

As shown in FIGS. 12A–12E, a gate insulating layer 30 made of silicon nitride or organic insulating material, etc., a hydrogenated amorphous silicon layer 40 and an n+ hydrogenated amorphous silicon layer 50 heavily doped with n type impurities such as phosphorous are deposited in sequence. The thickness of the three layers are 3,000–5,000 Å, 500–2,000 Å and 500 Å, respectively. The doped amorphous silicon layer 50 and the intrinsic amorphous silicon layer 40 are photo etched using a second mask to have an island shape on the gate electrode 21. As shown in FIGS. 12C and 12D, the gate pad and the data pad are also covered with the gate insulating layer 30.

As shown in FIGS. 13A–13E, a metal layer made of chromium, aluminum alloy or molybdenum having thickness of around 500 Å or less is deposited, and etched using a third mask to form a data wire including a data line 60, a sours and a drain electrodes 61 and 62, a data pad 63 and a data line connector 64 and a pixel wire including pixel electrodes line 66 (in FIG. 5) and pixel electrodes 65. Then, the exposed portions of the doped amorphous silicon layer 50 are removed using the data wire as an etch mask to expose the intrinsic amorphous silicon layer 40.

As shown in FIGS. 14A–14E, a silicon nitride or an organic insulating material layer is deposited to a thickness of 1,500–2,500 Å to form a passivation layer 70, and the passivation layer 70 is patterned to form contact holes 71, 73 and 75 exposing the data line 60, the data pad 63 and the data line connector 64 respectively. Contact holes 72 and 74 are also formed by removing portions of the gate insulating layer 30 and the passivation layer 70 on both of the gate pad 22 and the gate line connector 24.

As shown in FIGS. 6–10, a metal layer of 2,000–2,500 Å made of molybdenum, molybdenum alloy or aluminum alloy is deposited and patterned to form conductor patterns 80, 83, 85, 82 and 84. The conductor patterns 80, 83, 85, 82 and 84 may have a double-layered structure.

An alignment layer is coated on the substrate and rubbed. The gate line connector and the data line connector are removed by cutting off their branches.

The liquid crystal display according to the second embodiment of the present invention, the thickness of the pixel electrode is preferably about 500 Å or less, and that of the redundant data wire is preferably about 2,000–2,500 Å. The thin pixel electrode enables the passivation layer to have flat surface and thus reduces the light leakage due to the non-uniform rubbing. The thick redundant data wire has relatively small resistance, and thus it reduces the resistance of the data wire as well as prevents the open of the data wire.

In the meantime, since the redundant data wire forms an upper layer of the pad region, a pad material which is not easily broken in the manufacturing process may be used for the redundant data wire in order to improve the contact characteristic between the pad and the external driving integrated circuits. ITO (indium tin oxide) is an example of a pad material.

The redundant wire may have a double-layered structure including an upper ITO layer, such that the contact characteristic between the pad and the external driving integrated circuits is much more improved.

The pixel wire may be formed of the same layer as the redundant data wire.

That is, as shown in FIGS. 15A–16E, A gate wire including a gate line 20, a gate electrode 21, a gate pad 22 and a gate line connector 24 and a common signal wire including a common signal line 10 and common electrodes 11 are formed. A gate insulating layer 30, a hydrogenated amorphous silicon layer 40 and an n+ hydrogenated amorphous silicon layer 50 are deposited in sequence. The doped amorphous silicon layer 60 and the intrinsic amorphous silicon layer 40 are photo etched. A data wire 60, 61, 62 and 63 is formed on the gate insulating layer 30, and a passivation layer 70 having a contact hole 76 exposing the drain 500 Å or less. In this case the pixel wire and the redundant data wires are preferably formed of a material suitable for pad such as chromium, molybdenum or molybdenum alloy.

In the above embodiments of the present invention, several small portions of the passivation layer on the data wire are removed, and the data wire and the redundant data wire are electrically connected through the removed portions. However, as shown in FIGS. 18–23, a portion of the passivation layer 70 on the data wire 60, 63 and 64 may be removed completely, and the redundant data wire 80, 83 and 85 may be formed directly on the data wire 60, 63 and 64 to decrease the contact resistance between the data wire and the redundant data wire and to reduce the height difference between the upper surfaces of the redundant data wire and of the passivation layer.

In the second embodiment of the present invention, both the gate line connector and the data line connector are formed to have redundant wires, and the redundant gate line connector (or the longitudinal portion of the conductor pattern) and the redundant data line connector (or the transverse portion of the conductor pattern) which are formed of the same layer are short-circuited. However, one or both of the redundant gate line connector and the redundant data line connector may not be formed, and a conductor pattern connecting the data line connector and the gate line connector may be formed when the redundant data wire is formed.

Since the pixel electrode is formed thin in the liquid crystal displays according to the embodiments of the present invention, the height difference of the upper surfaces of the pixel electrodes and of the common electrodes is compensated by the relatively thick passivation layer formed on the pixel electrode. Therefore, the surfaces of the passivation layer and of the alignment layer thereon are flat and thus the uniform rubbing is possible. Accordingly, the contrast ratio increases due to the decrease of the light leakage. The data wire may have a open-free structure by forming the data wire as a double-layered structure or forming the redundant data wire. The manufacturing process is simple since only 5 masks are used. The contact characteristic between the driver IC (integrated circuit) and the pads is improved by using a pad material, which is not broken easily in the manufacturing process, as the pad or the redundant pad.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A liquid crystal display, comprising:
    a substrate;
    a gate line formed on the substrate;
    a gate pad formed on the substrate and electrically connected to an end portion of the gate line;
    common electrodes which are formed on the substrate and separated from the gate line;
    a gate insulating layer covering the gate line, the gate pad and the common electrodes and exposing at least a portion on the gate pad;
    a semiconductor layer formed on the gate insulating layer;
    source and drain electrodes contacted with the semiconductor layer;
    a data line electrically connected to the source electrode;
    a data pad electrically connected to an end portion of the data line;
    pixel electrodes electrically connected to the drain electrode, and parallel to the common electrode;
    a passivation layer covering at least a portion of the data line, the drain electrode and the source electrode, and exposing at least a portion of the gate pad exposed through the gate insulating layer and at least a portion of the data pad;
    a first redundant pattern which is formed on the passivation layer and electrically connected with the exposed portion of the gate pad; and a second redundant pattern which is formed on the passivation layer and electrically connected with the exposed portion of the data pad, wherein the first or the second redundant patterns are made of indium tin oxide.

2. The liquid crystal display of claim 1, wherein the data line includes a conductive layer made of one selected from chromium, molybdenum and molybdenum alloy.

3. The liquid crystal display of claim 1, wherein the thickness of the pixel electrodes is equal to or less than 1,000 Å.

4. The liquid crystal display of claim 1, wherein the thickness of the passivation layer is in the range of 2,000–4,000 Å.

5. The liquid crystal display of claim 1, wherein the data line has a dual-layered structure including a first conductive layer and a second conductive layer.

6. A liquid crystal display, comprising:

a substrate;

a gate line formed on the substrate;

a gate pad formed on the substrate and electrically connected to an end portion of the gate line;

common electrodes which are formed on the substrate and separated from the gate line;

a gate insulating layer covering the gate line, the gate pad and the common electrodes and exposing at least a portion on the gate pad;

a semiconductor layer formed on the gate insulating layer;

source and drain electrodes contacted with the semiconductor layer;

a data line electrically connected to the source electrode;

a data pad electrically connected to the drain electrode, and parallel to the common electrode;

a passivation layer covering at least a portion of the data line, the drain electrode and the source electrode, and exposing at least a portion of the gate pad exposed through the gate insulating layer and at least a portion of the data pad;

a first redundant pattern which is formed on the passivation layer and electrically connected with the exposed portion of the gate pad; and a second redundant pattern which is formed on the passivation layer and electrically connected with the exposed portion of the data pad, wherein the data line includes a conductive layer made of one selected from chromium, molybdenum and molybdenum alloy.

7. The liquid crystal display of claim 6, wherein the first or the second redundant patterns are made of indium tin oxide.

8. The liquid crystal display of claim 6, wherein the thickness of the pixel electrodes is equal or less than 1,000 Å.

9. The liquid crystal display of claim 6, wherein the thickness of the passivation layer is in the range of 2,000–4,000 Å.

10. The liquid crystal display of claim 6, wherein the gate line has a dual-layered structure including a first conductive layer and a second conductive layer.

11. A liquid crystal display, comprising:

a substrate;

a gate line formed on the substrate;

a gate pad formed on the substrate and electrically connected to an end portion of the gate line;

common electrodes which are formed on the substrate and separated from the gate line;

a gate insulating layer covering the gate line, the gate pad and the common electrodes and exposing at least a portion on the gate pad;

a semiconductor layer formed on the gate insulating layer;

source and drain electrodes contacted with the semiconductor layer;

a data line electrically connected to the source electrode;

a data pad electrically connected to an end portion of the data line;

pixel electrodes electrically connected to the drain electrode, and parallel to the common electrode;

a passivation layer covering at least a portion of the data line, the drain electrode and the source electrode, and exposing at least a portion of the gate pad exposed through the gate insulating layer and at least a portion of the data pad;

a first redundant pattern which is formed on the passivation layer and electrically connected with the exposed portion of the gate pad; and a second redundant pattern which is formed on the passivation layer and electrically connected with the exposed portion of the data pad, wherein the thickness of the pixel electrodes is equal to or less than 1,000 Å.

12. The liquid crystal display of claim 11, wherein the data line includes a conductive layer made of one selected from chromium, molybdenum and molybdenum alloy.

13. The liquid crystal display of claim 11, wherein the first or the second redundant patterns are made of indium tin oxide.

14. The liquid crystal display of claim 11, wherein the thickness of the passivation layer is in the range of 2,000–4,000 Å.

15. The liquid crystal display of claim 11, wherein the gate line has a dual-layered structure including a first conductive layer and a second conductive layer.

16. A liquid crystal display, comprising:

a substrate;

a gate line formed on the substrate;

a gate pad formed on the substrate and electrically connected to an end portion of the gate line;

common electrodes which are formed on the substrate and separated from the gate line;

a gate insulating layer covering the gate line, the gate pad and the common electrodes and exposing at least a portion on the gate pad;

a semiconductor layer formed on the gate insulating layer;

source and drain electrodes contacted with the semiconductor layer;

a data line electrically connected to the source electrode;

a data pad electrically connected to an end portion of the data line;

pixel electrodes electrically connected to the drain electrode, and parallel to the common electrode;

a passivation layer covering at least a portion of the data line, the drain electrode and the source electrode, and exposing at least a portion of the gate pad exposed through the gate insulating layer and at least a portion of the data pad;

a first redundant pattern which is formed on the passivation layer and electrically connected with the exposed portion of the gate pad; and a second redundant pattern which is formed on the passivation layer and electrically connected with the exposed portion of the data pad, wherein the thickness of the passivation layer is in the range of 2,000–4,000 Å.

17. The liquid crystal display of claim 16, wherein the data line includes a conductive layer made of one selected from chromium, molybdenum and molybdenum alloy.

18. The liquid crystal display of claim 16, wherein the thickness of the pixel electrodes is equal to or less than 1,000 Å.

19. The liquid crystal display of claim 16, wherein the first or the second redundant patterns are made of indium tin oxide.

20. The liquid crystal display of claim 16, wherein the gate line has a dual-layered structure including a first conductive layer and a second conductive layer.

21. A liquid crystal display, comprising:

a substrate;

a gate line formed on the substrate;

a gate pad formed on the substrate and electrically connected to an end portion of the gate line;

common electrodes which are formed on the substrate and separated from the gate line;

a gate insulating layer covering the gate line, the gate pad and the common electrodes and exposing at least a portion on the gate pad;

a semiconductor layer formed on the gate insulating layer;

source and drain electrodes contacted with the semiconductor layer;

a data line electrically connected to the source electrode;

a data pad electrically connected to an end portion of the data line;

a pixel electrodes electrically connected to the drain electrode, and parallel to the common electrode;

a passivation layer covering at least a portion of the data line, the drain electrode and the source electrode, and exposing at least a portion of the gate pad exposed through the gate insulating layer and at least a portion of the data pad;

a first redundant pattern which is formed on the passivation layer and electrically connected with the exposed portion of the gate pad; and a second redundant pattern which is formed on the passivation layer and electrically connected with the exposed portion of the data pad;

wherein the thickness of the pixel electrode is thinner than the thickness of the data line.

22. The liquid crystal display of claim 21, wherein the thickness of the passivation layer is in the range of 2,000–4000 Å.

23. The liquid crystal display of claim 21, wherein the first or the second redundant patterns are made of indium tin oxide.

24. The liquid crystal display of claim 21, wherein the data line includes a conductive layer made of one selected from chromium, molybdenum and molybdenum alloy.

25. The liquid crystal display of claim 21, wherein the thickness of the pixel electrodes is equal to or less than 1,000 Å.

26. The liquid crystal display of claim 21, wherein the gate line has a dual-layered structure including a first conductive layer and a second conductive layer.

* * * * *